United States Patent [19]

Schnee et al.

[11] Patent Number: 4,521,552

[45] Date of Patent: Jun. 4, 1985

[54] PROCESS FOR MAKING AN EMULSION POLYMER

[75] Inventors: Reiner Schnee, Darmstadt-Arheilgen; Jürgen Masanek, Pfungstadt, both of Fed. Rep. of Germany

[73] Assignee: Röhm GmbH, Darmstadt, Fed. Rep. of Germany

[21] Appl. No.: 465,775

[22] Filed: Feb. 11, 1983

[30] Foreign Application Priority Data

Feb. 27, 1982 [DE] Fed. Rep. of Germany ....... 3207113

[51] Int. Cl.$^3$ ................................................ C08L 3/00
[52] U.S. Cl. ..................................... 523/313; 523/346;
523/348; 524/458; 524/460; 524/801; 524/555;
526/64; 526/65; 526/292.2; 526/303.1; 526/317
[58] Field of Search ....................... 523/313, 346, 348;
524/458, 460; 526/64, 292.2, 303.1, 65, 317

[56] References Cited

U.S. PATENT DOCUMENTS 3,979,349  9/1976  Fink et al. .................. 260/29.6 RW
4,331,787  5/1982  Fairchok et al. ..................... 526/64

FOREIGN PATENT DOCUMENTS 843374   8/1960  United Kingdom .
1168551  10/1969  United Kingdom .
1478987  7/1977  United Kingdom .

Primary Examiner—Joseph L. Schofer
Assistant Examiner—J. M. Reddick
Attorney, Agent, or Firm—Curtis, Morris & Safford

[57] ABSTRACT

What is disclosed is a method for making a water-in-oil emulsion of a water soluble polymer of high molecular weight of polymerization of an aqueous monomer solution emulsified in an oil, even in large batches or continuously, comprising not moving the emulsion in a turbulent flow pattern at the start of polymerization and not mixing the emulsion at the start of polymerization with portions of emulsion which have been exposed to polymerization conditions for less time. Once polymerization has started, it is continued by the action of an initiator which decomposes to yield free radicals.

5 Claims, No Drawings

PROCESS FOR MAKING AN EMULSION POLYMER

The present invention relates to methods for making a water-in-oil emulsion of a water soluble polymer, which emulsion can be dispersed in water with dissolution of the polymer.

The preparation of water-in-oil (W/O) emulsions of this type has been described in published German patent application No. 24 12 266, for example. There an aqueous monomer solution containing an initiator is introduced into an oil with vigorous stirring under polymerization conditions and is simultaneously emulsified and polymerized.

In the practice of that process on an industrial scale, problems arise which are the more serious the greater the desired polymer concentration, the lower the amount of ionic monomer in the monomer mixture, and the larger the reaction volume. In many cases the necessary high molecular weights are not attained, while in other cases polymerization will not start, or then only after a long time.

In the process of published German patent application DE-AS No. 10 81 228, the polymerization of an aqueous monomer solution is carried out in the form of droplets having a diameter ranging from 10 to 2,000 microns suspended in oil. The resulting polymer emulsion is not stable and the polymer must be separated from the oil.

French Pat. No. 1,516,426 seeks to overcome the problems arising in polymerization by preparing an apparent emulsion, that is to say, an unstable emulsion, of the aqueous monomer solution in oil and maintaining the emulsified condition by agitation with a turbulent flow pattern during polymerization. While polymers of high molecular weight are obtained in this way, the polymer emulsion is not stable. If the amount of emulsifying agent is increased to the point where a genuine, stable, emulsion is formed, the polymer will not have a satisfactory molecular weight.

Published German patent application DE-AS No. 23 54 006 proposes that the polymerization be conducted with ultraviolet radiation in order to obtain polymers of particularly high molecular weight. However, it is difficult to carry out polymerizations on an industrial scale using ultraviolet radiation while maintaining the requisite residence time. It is necessary either to use equipment permeable to UV radiation or to immerse the source of UV radiation in the reaction mixture. Because of the short range of UV radiation in the emulsion, which usually has the opacity of milk, it is very difficult in the case of larger batches to bring the necessary amount of radiation to bear on the reaction mixture.

The object of the invention is to provide a method for making stable, storable W/O emulsions of water soluble polymers, which method can be practiced also on an industrial scale without giving rise to the problems described and which yields high molecular weight products. The method should be suitable for both continuous and batchwise operation. This object is accomplished by a method in which a stable emulsion in oil of an aqueous solution of $\alpha,\beta$-unsaturated monomers, capable of free radical polymerization, is exposed to conditions capable of initiating polymerization while in a polymerization zone. At the start of polymerization, turbulent flow patterns are avoided and polymerized or partially polymerized emulsion is not mixed with emulsion which has been exposed to polymerization conditions for less time. Polymerization, once started, is continued in the presence of an initiator decomposing to form free radicals.

The invention is based on recognition of the fact that the flow conditions prevailing at the time polymerization sets in have a decisive effect on the course of the polymerization and on the properties of the polymer being formed. At that point in time, mixing with portions of the emulsion in which polymerization has not yet started will have an inhibiting effect on polymerization. Nonionic monomers, or monomer mixtures formed largely of nonionic monomers, and especially acrylamide, are particularly sensitive to this inhibiting influence. On the other hand, the mixing of a portion of the emulsion in which polymerization has just set in with other portions in which it has been in progress for some time will not be deleterious.

Thus, an essential condition of the present invention is that at the time polymerization starts in a given volume unit no mixing occur between that unit and volume units which have been exposed to polymerization conditions for less time. Even in a polymerization vessel which is being agitated with a turbulent flow pattern, the polymerization starting conditions are not distributed so uniformly that polymerization would set in everywhere at the same time. In any case, turbulent mixing will give rise to the problems mentioned, such as retardation or inhibition of the onset of polymerization, whereas these problems are avoided when the emulsion is not agitated, or at least is not agitated with turbulent fluid motion, at the time polymerization sets in.

When all volume units in a pipe are in motion, they are sufficiently separated from one another so that no deleterious mixing will occur, provided that there are no substantial differences in the flow rate at different points of the pipe cross section. It has been found that gas bubbles, which move faster in a pipe than an emulsion, generally produce no detrimental turbulences. The method of operation in accordance with the invention will hereinafter be referred to as being "backmixing-free".

On the basis of what is known, in general no reciprocal mixing of emulsion droplets occurs when the emulsion moves in a turbulent flow pattern or when volume units of the emulsion mix with one another. Therefore, the disturbances observed do not appear to be due to a mixing of polymerizing and nonpolymerizing emulsion droplets. Why the mixing of portions of the emulsion nevertheless gives rise to disturbances is something for which no scientific explanation has so far been found. It was therefore all the more unlikely that the measures in accordance with the invention would have a beneficial effect on the course of the polymerization, especially since in the case of the unstable emulsions of French Pat. No. 1,516,416 turbulent motion is essential to a favorable course of the polymerization.

The start of polymerization is the time when polymer molecules are beginning to form. Frequently this does not occur as soon as polymerization conditions prevail, for example when polymerization inhibiting impurities such as oxygen result in a period of inhibition. During that period, free radicals are consumed in the reaction with the inhibiting impurities. Polymerization then sets in only when these impurities have been rendered ineffective by reaction with the radicals. The time when polymerization starts is indicated by the evolution of heat and in many cases by a clouding of the mixture.

When a sample of the reaction mixture is poured into a liquid which is miscible with the liquid phases of the reaction mixture but will not dissolve the polymer, the presence of polymer which has formed is indicated by precipitation or turbidity. Examples of such liquids are lower alcohols and ketones.

By "polymerization conditions" is meant a state in which free radicals are acting upon the emulsion. The radicals may be formed conventionally by radiation or by the decomposition of appropriate initiators. When no inhibiting impurities are present, polymerization will set in as soon as the polymerization initiating conditions become effective. The presence of inhibiting impurities may give rise to a period of inhibition ranging from a few seconds to half an hour. At the start of that period, turbulent mixing of the monomer emulsion will not be detrimental, just as backmixing with portions of emulsion introduced earlier will not be detrimental right after the start of polymerization. It will therefore suffice to avoid all backmixing for a short time until polymerization has started. Since the onset of polymerization cannot always be determined with precision, it will be advantageous to prevent backmixing from the time that the emulsion is introduced into the polymerization zone until a conversion of at least 1 weight percent, and preferably at least 3 weight percent, of the monomers has been obtained. The sooner backmixing is prevented after the monomer emulsion has been introduced into the polymerization zone, the better reproducible the entire course of the polymerization will be.

Since radiation induced polymerization is difficult to carry out with large batches or continuous industrial processes, it is appropriate only for the polymerization starting phase. After the onset of polymerization, at least part of the polymerization is started by means of initiators which decompose to yield free radicals. This definition encompasses thermal initiators and redox initiator systems.

The advantages offered by the invention become clear when the results are compared of polymerizing a 76% aqueous solution of a mixture of 30 parts by weight of acrylamide and 70 parts by weight of methacryloyloxyethyltrimethyl-ammonium chloride which has been emulsified in an amount of oil equal by weight to two thirds of the monomer solution under different conditions. In polymerization with pronounced backmixing, the monomer solution was introduced continuously into a reaction mixture which was being vigorously agitated under polymerization conditions and from which polymer emulsion was being continuously withdrawn corresponding with the feed rate. In a second test in accordance with the invention, the monomer emulsion was caused to flow, prior to entering the agitated vessel, under polymerization conditions through a pipe coil in which it moved in a laminar flow pattern without backmixing, then entering the agitated vessel after some conversion of the monomers. From the polymers so obtained, 1% aqueous solutions were prepared. The solution of the polymer obtained in the first of these tests had a viscosity of only 1750 mPas whereas the solution of the polymer prepared in accordance with the invention had a viscosity of 5400 mPas. In other cases, for example with a ratio of the aforesaid monomers of 1:1, polymerization of the agitated reaction mixture would not start at all for several hours, whereas polymerization of the same emulsion flowing through the pipe coil without backmixing started after a residence time of about 15 minutes.

W/O emulsions of water soluble polymers which have a cationic, anionic, or nonionic character can be prepared in accordance with the invention. The oil content may range from 15 to 60 weight percent, for example, and preferably ranges from 25 to 50 weight percent. Following preparation, the polymer phase will contain as much water as was used to dissolve the monomers. The water content frequently ranges from 10 to 50 percent, and preferably ranges from 15 to 30 percent, based on the weight of the polymer phase. The water content can be removed in whole or in part by azeotropic distillation. The polymer phase forms liquid droplets or gel like or hard particles of an average diameter ranging from about 1 to 10 microns. Depending on the proportion of the polymer phase, the W/O emulsion will range from highly fluid to highly viscous or pastelike, the viscosity preferably being in the 600 to 2000 mPas range. With the process of the invention, molecular weights of up to several million can be obtained. 1% aqueous solutions of the polymers will have viscosities ranging from 500 to 10,000 mPas, for example.

The W/O emulsion can be dissolved in water, with the addition of wetting agents if need be, with the polymer passing into solution and the oil phase being emulsified. Aqueous solutions are used as thickeners, flocculation and sedimentation aids, retention agents in papermaking, dyeing aids, and hair groomers.

The practice of the invention is described in greater detail below.

(a) Monomers

The monomers overall must be water soluble to the extent that an at least 10% aqueous solution thereof can be prepared at the polymerization temperature. When a mixture of different monomers is used, it will suffice if the mixture as a whole possesses that solubility; individual monomer components may be sparingly soluble or insoluble in water.

The monomers may be of anionic, cationic, or nonionic nature. Mixtures of such monomers are also suitable for use, particularly mixtures of anionic and nonionic monomers or of cationic and nonionic monomers. In many cases, mixtures of cationic and anionic (and optional nonionic) monomers are compatible, as is known from published German patent application No. 28 32 944, for example.

Examples of anionic monomers are $\alpha,\beta$-unsaturated mono- or di-carboxylic acids such as acrylic, methacrylic, itaconic, maleic, or fumaric acid, their water soluble salts and particularly the alkali metal and ammonium salts, as well as vinylsulfonic acid, acrylamidoalkanesulfonic acids, and phenylvinylphosphonic acids and their salts.

Examples of cationic monomers are vinylpyridine, vinylimidazole, vinylimidazoline, vinylimidazolidine, aminoalkyl esters and aminoalkylamides of unsaturated polymerizable carboxylic acids such as the 2-dimethylaminoethyl, 2-dimethylaminopropyl, 4-dimethylaminobutyl, 3-dimethylaminooneopentyl, diethylaminoethyl, morpholinoethyl, and piperidinoethyl esters of acrylic acid or of methacrylic acid, dimethylaminopropyl acrylamide or methacrylamide, and the salts and products of quaternization of these compounds.

Examples of nonionic monomers which are at least partially water soluble are acrylamide and methacrylamide, hydroxyalkyl esters of acrylic acid or of methacrylic acid, and in particular the 2-hydroxyethyl and 2-hydroxypropyl esters, and vinylpyrrolidone.

Preferred monomers or mixtures of monomers are those composed of acrylamide or methacrylamide on the one hand and dialkylaminoalkyl esters or alkylamides of acrylic acid or of methacrylic acid on the other hand. Mixtures of these two types of monomers in a weight ratio ranging from 95:5 to 5:95 are particularly preferred.

(b) Oil phase

The oil phase of the monomer emulsion may be formed of any organic liquid which is not miscible with the aqueous monomer solution, does not boil below the polymerization temperature, and will not inhibit the free radical polymerization. Liquids having a pronounced chain transfer effect, such as carbon tetrachloride, are not particularly suitable when products of very high molecular weight are desired. Aliphatic hydrocarbons such as gasoline, kerosene, paraffin oil, and mineral oils; aromatic hydrocarbons such as benzene, toluene, or xylene; esters of chlorinated hydrocarbons, etc., are suitable for use.

(c) Emulsification

In the process of the invention, a stable emulsion is used, that is the emulsified condition must be maintained for at least 30 minutes even without agitation without the phases beginning to separate or coagulate.

As a rule, stability of the monomer emulsion and of the polymerized W/O emulsion cannot be secured merely by emulsifying the aqueous monomer solution in the pure oil phase. A suitable W/O emulsifier having a low hydrophilic-lipophilic balance (HLB) is therefore generally used. That emulsifier is best dissolved in the oil phase before the monomer solution is emulsified therein. Sorbitan fatty acid esters such as the esters of oleic acid, stearic acid, palmitic acid, and lauric acid, as well as the corresponding fatty acid esters of oxyethylated sorbitan are particularly well suited. Another class of emulsifiers is formed by oil soluble copolymers composed predominantly of monomer units which have fairly long side chains usually containing six or more carbon atoms, such as acrylate or methacrylate esters of higher aliphatic alcohols, and which further contain units of hydrophilic, and in particular of basic, comonomers such as aminoalkyl esters of acrylic or methacrylic acid. Such emulsifiers are known from published German patent application No. 24 12 266. They have the special property of acting as W/O emulsifiers while in the form of a base and, after reaction with an acid, as O/W (oil-in-water) emulsifiers while in the form of a salt. The acid can be introduced already into the W/O emulsion and becomes effective only when the W/O emulsion is dispersed in water and the water soluble polymer passes into solution.

For effective emulsification of the monomer phase and, after its polymerization, of the polymer phase, from about 2 to 20 weight percent, based on the weight of the oil phase, of oil soluble emulsifiers is dissolved in the oil and the monomer phase is emulsified therein by vigorous agitation.

(d) Polymerization

Polymerization of the emulsified monomers is initiated by free radicals which can be produced in the polymerization zone by any of the usual methods. For example, the emulsion may be exposed to high energy radiation such as electronic radiation or UV radiation. Preferably, however, polymerization is started by means of initiators which may be dissolved in the organic liquid but which are preferably dissolved in the monomer emulsion. Once polymerization has set in, it is not advisable to initiate further polymerization by UV radiation alone. In accordance with the invention, polymerization during the phase which follows the onset of polymerization is started at least in part by means of initiators which decompose to yield free radicals. For example, until a conversion of a few percent of the monomers used has been attained, the emulsion may be caused to flow through a prereactor formed of a glass tube which is permeable to ultraviolet light and in which polymerization is initiated by irradiation with UV light, polymerization then being continued by means of a thermal initiator or redox initiator after the emulsion has entered an agitated vessel. However, the polymerization in the prereactor may also be started by the use of such initiators. Suitable photoinitiators include benzoin, benzoin ethers, acyloins and their ethers, benzophenones, anthraquinones, anthraquinone carboxylic acids, etc. The initiators decomposing to produce free radicals which are used for continuation of the polymerization may be thermal initiators, for example, alkali metal persulfates or ammonium persulfate, azo compounds such as azobisvalerianic acid or azobisisobutyronitrile, or redox initiator systems. For the latter, a peroxy compound soluble in the oil phase, for example, tert-butyl peroxypivalate, is used in combination with a reducing component such as sodium pyrosulfite. The initiators are used in the usual amounts, for example, from 0.01 to 1 weight percent, based on the weight of the monomers. Photopolymerization may be initiated with ultraviolet light at, or even below, room temperature. The radiation should be in the wavelength range from 150 to 500 nm, and more particularly from 200 to 400 nm, which can be produced with a mercury vapor, xenon arc, or tungsten lamp, a carbon arc lamp, or preferably with fluorescent lamps. For thermal initiation of the polymerization, the emulsion is heated in the polymerization zone to the temperature of decomposition of the initiator, which usually is in the 40° C. to 80° C. range. After polymerization has set in, the heat of polymerization is removed by cooling. Redox initiator systems are effective at temperatures between 20° C. and 50° C.

(e) Polymerization zone

The polymerization zone is the region in the process equipment in which polymerization conditions prevail or will be established in the course of the method. In batch operation, a simple agitated vessel in which the emulsion is produced and then polymerized will suffice. As soon as polymerization conditions prevail, the rate of agitation is considerably reduced or, preferably, agitation is stopped altogether until the onset of polymerization. Once it has set in, agitation may be resumed at the necessary rate and the polymerization continued with external cooling.

The process is preferably carried out continuously. The polymerization zone may then be composed of several sections through which the monomer emulsion, fed in continuously, passes stepwise.

When an extended period of inhibition is likely in continuous operation, for example because the monomers incorporate substantial amounts of stabilizer, a prereactor can be used in which the emulsion may move in a turbulent flow pattern. For example, an agitated vessel with a built-in UV radiation source is suitable. The residence time of the emulsion in the agitated vessel must be shorter than the period of inhibition so that no polymerization occurs in the steady state and a mixture ready to be polymerized can be withdrawn continuously.

Said mixture can then be piped to a second reactor in which no backmixing occurs. For example, a pipe or pipe coil, which in the case of UV-induced polymerization must be permeable to UV light and is irradiated with UV light, is suitable for this purpose. The emulsion may further be caused to move in a layer through a suitable trough, it being possible in the case of UV-induced polymerization to operate even without an inert gas atmosphere. If the polymerization is initiated thermally, the pipe, pipe coil, or trough is heated externally to the temperature at which polymerization sets in.

The rate of flow in this zone should be adapted to the cross section of the pipe so that the emulsion moves in a laminar flow pattern and there is no turbulence. The limiting conditions for laminar flow can be defined by the Reynolds number (see DIN 53012), into the determination of which the flow rate and viscosity of the flowing medium enter, along with the geometry of the pipe through which it flows. In the backmixing-free phase, the continuous polymerization can, if necessary, be carried out in an agitated vessel with mild agitation, optionally intermittently, provided that mixing of the individual volume units with volume units fed in later is substantially prevented. Since the period of inhibition usually is short, the monomer emulsion is preferably introduced from the outset into a polymerization zone where no backmixing occurs and is retained therein until at least 1 percent, and preferably from about 3 to 10 percent, conversion has been obtained.

Once polymerization has set in, further polymerization can be performed with or without backmixing. The reacting mixture may continue to flow through a pipe coil, for example, or it may be discharged from the backmixing-free reactor into an agitated vessel where polymerization is continued. The residence time in the polymerization zone should be long enough to permit as nearly complete conversion of the monomers as possible. The residence time, which will depend on the nature of the polymerization zone, may range from 5 to 300 minutes and preferably is between 30 and 180 minutes.

The heat of polymerization can be removed more readily when turbulent motion is induced in the emulsion after polymerization has set in. When this phase of the polymerization is carried out in a tubular reactor, it will be advisable to make provision for the flow conditions to be such that there is turbulence. A cooling medium may be circulated around the tubular reactor. The heat of polymerization can readily be removed also when polymerization is carried out in an agitated vessel equipped with a cooling jacket.

A better understanding of the invention and of its advantages will be had by reference to the following specific Examples, given by way of illustration.

EXAMPLE 1

6.32 kg/h of an oil phase, 9.464 kg/h of an aqueous monomer phase, and 36 ml/h of an initiator solution were introduced into an agitated vessel equipped with a heavy duty agitator and emulsified during a residence time of about 2 minutes.

Composition of oil phase:
 23.4 kg of mineral oil,
 8.2 kg of a polymeric emulsifier composed of a copolymer of 30 wt. % dimethylaminoethyl methacrylate and 70 wt. % of a long chain methacrylate ether, and
 0.0018 kg of tert-butyl peroxypivalate.

Composition of aqueous monomer phase:
 18 kg of acrylamide,
 18 kg of methacryloxyethyl-trimethyl-ammonium chloride,
 8.8 kg of water, and
 1.8 kg of adipic acid.

Composition of initiator solution:
 180 ml of water,
 1.3 g of ferrous sulfate, and
 1.3 g of sodium pyrosulfite.

The initiator solution was mixed with the monomer phase just before the latter entered the agitated vessel. In the vessel, a carbon dioxide atmosphere was maintained.

The emulsion produced in the agitated vessel was continuously conducted to a backmixing-free prereactor consisting of an upright pipe coil having a length of 16 meters and an inside diameter of 1 cm which was disposed in a water bath at 40° C. The residence time of the emulsion in the prereactor was 8 minutes. From there it was conducted to a 100-liter agitated vessel which at the start of the continuous feed contained an initial charge of 8 kg of finished product. Over a period of 5 hours, about 80 to 90 kg of the end product accumulated. A maximum temperature of 50° C. was maintained in the agitated vessel by cooling. A carbon dioxide atmosphere filled the gas space. After 5 hours' operation, the feed was shut off and the contents of the agitated vessel were heated to 70° C. After a postreaction time of 2 hours, the end product was ready to be discharged. 8 kg were left in the agitated vessel for continuation of the process.

The end product contained 45.7 wt. % of the water soluble polymer, which had a viscosity of 1800 mPas. The product dissolved readily in water. A 1% solution in distilled water had a pH value of 3.8 and a viscosity of 6800 mPas.

For comparison, the same reaction was carried out without the use of a prereactor. The emulsion produced in the first agitated vessel from mineral oil, the aqueous monomer phase, and the initiator solution, was pumped directly to the 100-liter agitated vessel. With this procedure, polymerization did not set in within 2 hours at 40° C.

EXAMPLE 2

The procedure of Example 1 was repeated with the following mixture:

Composition of oil phase:
 21.9 kg of mineral oil,
 6.75 kg of the polymeric emulsifier used in Example 1, and
 2.8 g of tert-butyl peroxypivalate.

Composition of aqueous monomer phase:
  11.3 kg of acrylamide,
  26.2 kg of methacryloxyethyltrimethylammonium chloride,
  1.9 kg of adipic acid, and
  11.3 kg of water.

Composition of initiator solution:
  180 ml of water,
  1.9 g of ferrous sulfate, and
  1.9 g of sodium pyrosulfite.

The organosol so formed contained 47.3 wt. % of the water soluble polymer and had a viscosity of 1700 mPas. A 1% aqueous solution of the organosol in distilled water had a pH value of 3.5 and a viscosity of 6700 mPas.

For comparison, the prereactor was again dispensed with. Polymerization set in at 40° C. in the 100-liter agitated vessel with some delay. Much of the polymerization occurred only after heating to 70° C. The polymer content of the organosol was 47.3 wt. %. The viscosity of the organosol was only 370 mPas. The viscosity of a 1% solution in distilled water was decidedly lower than it had been in the case of the product obtained by the use of a prereactor, namely, just 3400 mPas. The pH value was 3.65.

EXAMPLE 3

A preliminary emulsion was prepared from
  216 g of mineral oil,
  11 g of sorbitan monooleate,
  425 g of water,
  272 g of acrylamide, and
  0.2 g of azobisisobutyronitrile
under a nitrogen atmosphere and stored until it was used.

The polymerization vessel was a 2-liter round-bottomed flask equipped with a paddle agitator. It was charged with 76 g of mineral oil and 4 g of sorbitan monooleate, which were heated to 50° C. The gas space was filled with nitrogen. The preliminary emulsion was fed to the agitated vessel at a uniform rate over a period of 2 hours. During the first half hour, the agitator was not operated. For the next 15 to 20 minutes, the agitator was operated slowly and intermittently so that essentially only horizontal mixing of the content of the reactor occurred. Thereafter agitation was continuous but without producing turbulence. The temperature gradually rose to 60° C. After the preliminary emulsion had been fed in, the temperature was raised to 100° C. and agitation was continued for 1 hour.

The organosol so formed contained 28.5 wt. % of polyacrylamide and had a viscosity of 270 mPas. It could be dissolved in water in the presence of a wetting agent and gave a 1% solution having a viscosity of 1650 mPas. The pH value was 8.5.

If the same procedure is followed but with uniform vigorous agitation, polymerization will not start.

EXAMPLE 4

Batch

Solution I:
  180 g of acrylamide,
  115.7 g of a 70% aqueous solution of methacryloxyethyl-trimethylammonium chloride,
  13.5 g of adipic acid,
  70.3 g of distilled water,
  0.0054 g of sodium pyrosulfite
    (=0.002% based on monomers),
  0.0054 g of ferrous sulfate
    (=0.002% based on monomers),
  0.0095 g of benzoin
    (=0.0035% based on monomers), and
  0.00405 g of anthaquinone-2-sulfonic acid sodium salt
    (=0.0015% based on monomers)

Solution II:
  151.5 g of mineral oil,
  48.0 g of a copolymer of 24% dimethylaminoethyl methacrylate and 76% long chain methacrylate ester,
  12.0 g of sorbitan trioleate ethoxylate, and
  0.0054 g of tert-butyl peroxypivalate
    (=0.002% based on monomers)

Procedure

Solutions I and II were emulsified and the monomer emulsion was fed to the reaction flask with a metering pump through a pipe having a length of 68 cm and a diameter of 2.5 cm. Polymerization of the mixture was initiated in the pipe by ultraviolet irradiation (with a Philips TL 20-W/05 tracing lamp). The lamp was located at a distance of 5 to 7 cm. Further reaction took place in the reaction flask by redox polymerization with simultaneous introduction of carbon dioxide.

Result

Reaction set in readily and the reaction proceeded well in the reaction flask.

Characteristics

Content of active-ingredient: 45%
Viscosity of organosol: 2750 mPas
1% solution in distilled water: 2800 mPas., ph 3.8.

What is claimed is:

1. A method for making a stable water-in-oil emulsion of a water soluble polymer, which method comprises,
    (1) in a first reaction stage, producing free radicals in a stable oil-in-water emulsion comprising an aqueous solution of at least one water soluble monomer emulsified in oil in the presence of a water-in-oil emulsifier and maintaining said emulsion under conditions free of backmixing until polymerization of said monomer or monomers is initiated and then,
    (2) in a second reaction stage, completing said initiated polymerization in the presence of free radical initiators while turbulently agitating said emulsion.

2. A method as in claim 1 wherein the backmixing-free conditions of said first reaction stage are maintained until at least 1 percent by weight of said monomer or monomers has been converted by polymerization.

3. A discontinuous method as in claim 1 wherein said emulsion is not stirred in said first reaction stage but is turbulently stirred in said second reaction stage.

4. A discontinuous method as in claim 1 wherein said emulsion is stirred without turbulence in said first reaction stage but is turbulently stirred in said second reaction stage.

5. A continuous method as in claim 1 wherein said emulsion flows laminarly during said first reaction stage but is turbulently stirred in said second reaction stage.

* * * * *